(No Model.) 2 Sheets—Sheet 1.
P. A. MYERS.
STORE LADDER.
No. 581,239. Patented Apr. 20, 1897.
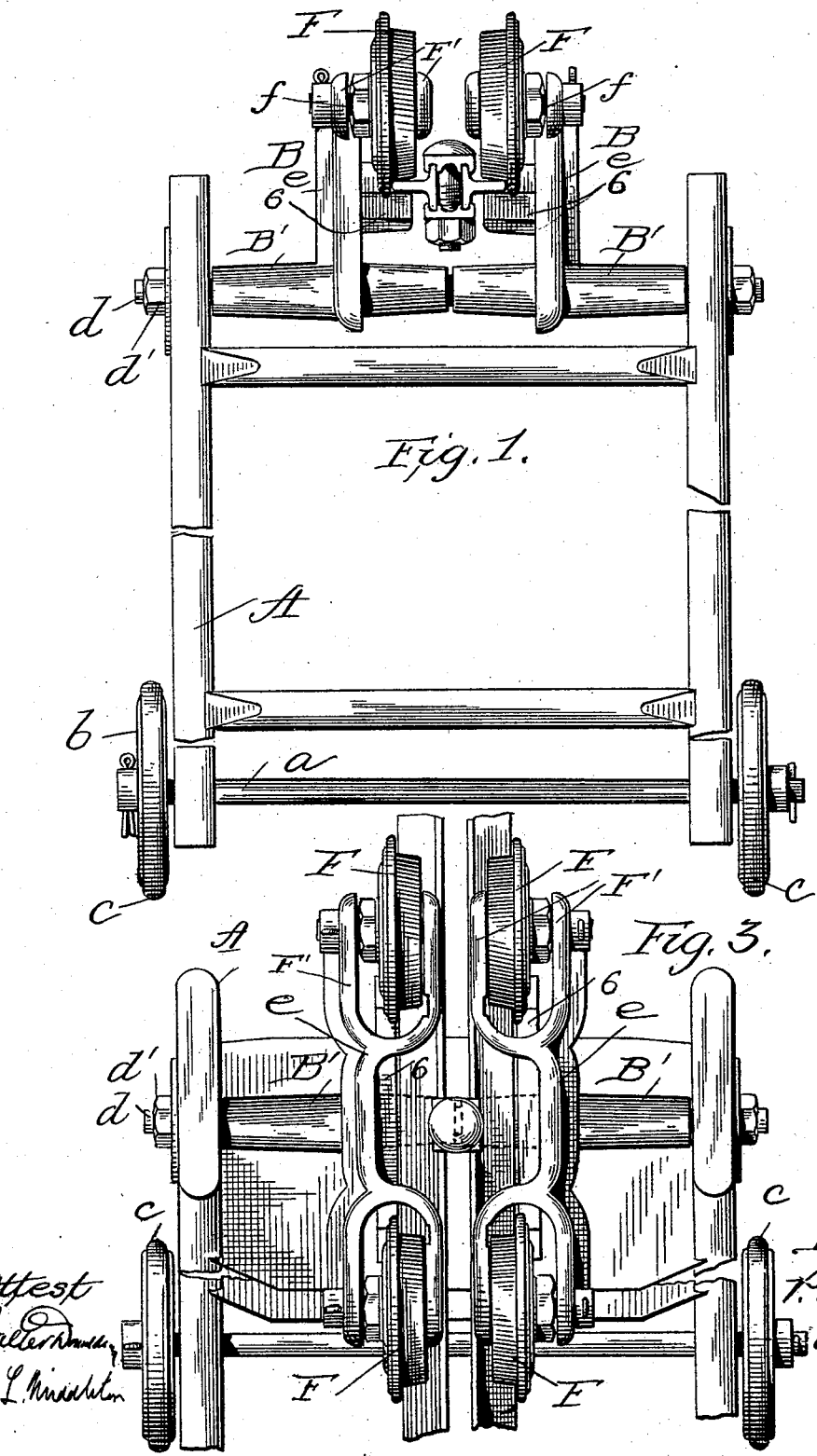

(No Model.) 2 Sheets—Sheet 2.
P. A. MYERS.
STORE LADDER.
No. 581,239. Patented Apr. 20, 1897.
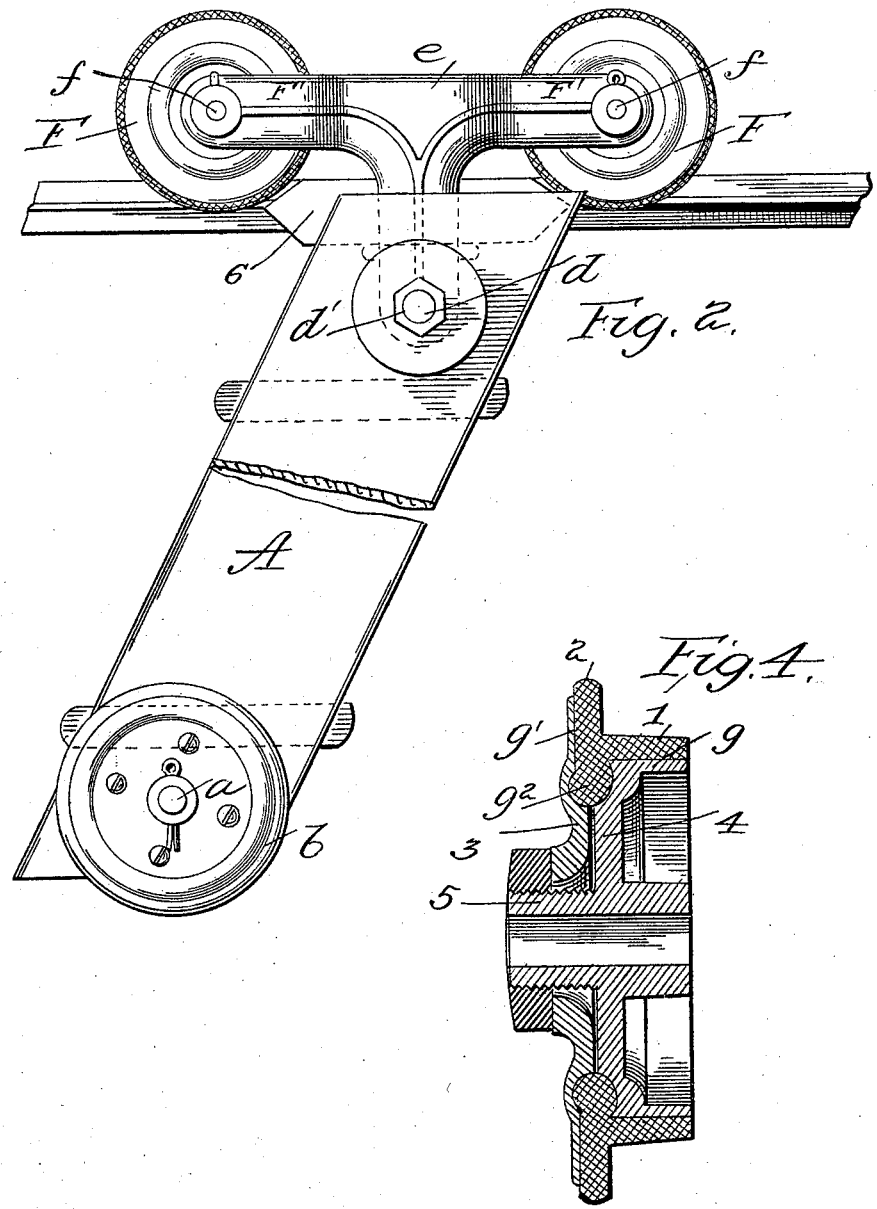
Attest
Mullern Donaldson
F. L. Middleton
Inventor
P. A. Myers
by Ellis Spear
Atty.

UNITED STATES PATENT OFFICE.

PHILIP A. MYERS, OF ASHLAND, OHIO, ASSIGNOR TO THE F. E. MYERS & BRO., OF SAME PLACE.

STORE-LADDER.

SPECIFICATION forming part of Letters Patent No. 581,239, dated April 20, 1897.

Application filed February 23, 1895. Serial No. 539,457. (No model.)

*To all whom it may concern:*

Be it known that I, PHILIP A. MYERS, a citizen of the United States, residing at Ashland, in the county of Ashland and State of Ohio, have invented certain new and useful Improvements in Store-Ladders, of which the following is a specification, reference being had therein to the accompanying drawings.

My invention is designed especially to provide a trolley connection for a store-ladder where such ladders are used along the line of the shelving and require a movable connection at the top so that they can be readily moved to gain access to any part of the shelving.

In carrying out my invention I have aimed, first, to provide a form of carrier composed of two sections independent of each other, each connection carrying a pair of wheels and having a pivoted connection between each section and the ladder, so that any inequalities in the track will be taken up and absorbed by the connections intermediate the track and the ladder.

The invention also includes the form of trolley-wheel which makes the operation of the trolley noiseless, and the important element of novelty in this wheel is that it has, in addition to a rubber tread, a rubber flange.

The invention also includes details of construction which will be more fully described hereinafter.

In the drawings, Figure 1 is a front view of the carrier with the ladder connected thereto. Fig. 2 is a side elevation. Fig. 3 is a plan view, and Fig. 4 is a detail view of one of the wheels.

The ladder A is of the ordinary construction, and its lower end carries a rod $a$, to the ends of which are secured wheels $b$ made in sections clamped together with a rubber tire $c$ clamped between the sections, and these wheels bear on the floor, making the movement of the ladder at this point noiseless.

At the upper end of the ladder a rod $d$ passes through between the sides, being properly secured by nuts $d'$, and this rod forms a support and connection between the ladder and the carriers for the wheels. I use two of these carriers B, duplicates of each other, and each one is provided with a sleeve $B'$ encircling the rod $d$, so as to have free movement thereon. This sleeve connection provides a pivot for the upper end of the ladder, and the lower end of the ladder may be freely moved by reason of this pivotal connection to clear any obstructions on the floor. Each sleeve carries a bracket $e$, which is substantially T-shaped, and upon each end of the T a wheel F is carried, being journaled on a pin $f$, which passes through the wheel and has its bearings in the yoked end F' of the bracket. Thus the wheels are supported on each side and have free movement on the pins, the pins being secured in any suitable way. A wheel is located at each end of the bracket, and these wheels are provided with a tread portion $g$, and a flange $g'$, projecting at one side above the tread portion, and they are thus adapted to the form of track illustrated and which is well known in connection with carriers of all kinds. It will be seen that as each set of wheels is independently connected to the cross-rod at the top of the ladder they are independent of each other and the irregularities of the track will not be communicated from one set of wheels to the other, as would be the case were the carrier in one piece. Neither will the irregularities be communicated to the ladder, as the pivotal connection will prevent this.

The wheel itself is of improved construction and is shown in the detail view. I form this wheel of a rubber form having a horizontal tread 1 and a vertical flange 2 at one side, which has a continuation $g^2$ extending below the line of the horizontal flange, and within the horizontal flange I place a metal center 4, which bears against the inner continuation of the vertical flange. In order to protect this vertical flange, a back plate 3 is slipped over a threaded projection 5 of the metal center, and a nut fitted to this clamps the back plate securely in place and holds all the parts together. The flange $g^2$ is ring-shaped substantially circular in cross-section, which presents rounded faces at front and rear, and the back plate 3 is grooved to fit this snugly, while the metal center piece is likewise grooved in the edge of its inner face, and thus a construction is provided which makes a perfect antirattler.

To prevent the wheels of the carrier leaving the tracks, I have provided the stop-blocks 6, which are attached to the opposing faces of each bracket and extend beneath the rails in close proximity thereto, as shown in Fig. 1. The blocks are adapted to contact with the rails in the tilting of the ladder, thus preventing the wheels of the carrier getting off the track.

Having thus described my invention, what I claim is—

1. The combination with the track, of a ladder and a carrier therefor composed of two sections arranged one on each side of said track, each of said sections having independent pivoted connection with said ladder, substantially as described.

2. In combination, a ladder, a rod extending across the top thereof, a carrier comprising the brackets with wheels carried thereby, and the sleeves carried by said brackets for connecting the same to the rod, said sleeves being elongated and forming space-blocks to maintain said brackets centrally on said rod.

3. In combination, the tracks, the carrier comprising the brackets wheels carried thereby, and the blocks secured to said brackets extending beneath said tracks and adapted to contact with the same to prevent said wheels jumping said tracks, substantially as described.

4. In combination with a wheel, an elastic tread, a flange projecting from one edge thereof outwardly, and a second flange projecting inwardly, both flanges being integral with the tread, and means for securing the second flange to the wheel, substantially as described.

5. A wheel having an elastic tread, a flange 2, an elastic flange $g^2$ having rounded faces, and a backing and center plate correspondingly grooved to receive said flange.

6. A wheel comprising the metal center having a flange at the outer edge thereof, a threaded stud projecting from said plate, a backing-plate surrounding said stud, a nut fitting said stud and binding said backing-plate against said center and an elastic portion comprising a tread fitted to said flange at the outer edge of the center, a flange covering the face of said backing-plate, and a depending flange held between the adjacent faces of the center and backing-plate, substantially as described.

In testimony whereof I affix my signature in presence of two witnesses.

PHILIP A. MYERS.

Witnesses:
A. N. MYERS,
JOHN E. McDOWELL.